United States Patent [19]

Briggs

[11] Patent Number: 4,548,315

[45] Date of Patent: * Oct. 22, 1985

[54] TETHERED VEHICLE FOR MOVING BULK MATERIAL

[75] Inventor: Aubrey C. Briggs, Carnegie, Pa.

[73] Assignee: Dravo Corporation, Pittsburgh, Pa.

[*] Notice: The portion of the term of this patent subsequent to Mar. 26, 2002 has been disclaimed.

[21] Appl. No.: 501,835

[22] Filed: Jun. 7, 1983

[51] Int. Cl.⁴ .............................................. B65G 19/00
[52] U.S. Cl. ................................. 198/728; 198/304; 198/519; 198/520; 198/638
[58] Field of Search ............... 198/304, 519, 520, 638, 198/726, 728, 861, 497, 840, 711; 414/298, 144, 143, 300, 304, 313, 327; 280/447, 456 R, 465, 467, 470, 472; 180/319, 19.1, 9.22

[56] References Cited

U.S. PATENT DOCUMENTS

| | | | |
|---|---|---|---|
| 708,616 | 9/1902 | Bearman | 198/520 |
| 961,756 | 6/1910 | Crouch | 180/319 |
| 1,162,946 | 12/1915 | Olson | 280/470 |
| 1,498,845 | 6/1924 | Lakin | 198/844 |
| 1,548,497 | 8/1925 | Weeks | 198/520 |
| 2,345,496 | 3/1944 | Opheim | 180/19.1 |
| 2,881,904 | 4/1959 | Hoerth | 198/840 |
| 3,029,926 | 4/1962 | Carlson | 198/638 |
| 3,050,881 | 8/1962 | Brown | 198/519 |
| 3,153,476 | 10/1964 | Barendsen et al. | |
| 3,861,518 | 1/1975 | Dibben et al. | 198/711 |
| 3,992,060 | 11/1976 | Bargel et al. | 198/861 |
| 4,126,236 | 11/1978 | Schultz | 198/519 |
| 4,170,433 | 10/1979 | Haahjem | 198/519 |

FOREIGN PATENT DOCUMENTS

1087532 4/1955 Fed. Rep. of Germany.
1373170 11/1974 United Kingdom.

Primary Examiner—Joseph E. Valenza
Assistant Examiner—Michael Stone
Attorney, Agent, or Firm—Parmelee, Miller, Welsh & Kratz

[57] ABSTRACT

A tracked vehicle is tethered so that as it skids on a pile of bulk material, the cleated tracks transfer the material toward the tethered end. The tethering rope hitch point on the vehicle is translatable laterally to effect controlled sideward skiding for sweeping bulk material from a wide area and is located at one end above the vehicle center of gravity so that the vehicle can be lowered by the tethering rope through narrow openings in storage chambers yet come to rest upright. The tracks comprise cleated endless belts coupled to endless wire ropes at the end pulleys by resilient rail members made of two rows of discrete blocks bolted to the belts which are wedged against the wire ropes by grooves in the pulleys so that tension induced in the wire ropes resists the lateral forces tending to cause the belts to creep along the pulleys. The vehicle frame comprises a sealed, structurally rigid, elongated box for each endless track in which the drive motors are protected and channel members extending along the sides and beyond the ends of the elongated box with the end pulleys mounted between the extended ends thereof. In an alternate form, the tethered end of the vehicle trails upward so that it can pile material higher.

29 Claims, 14 Drawing Figures

TETHERED VEHICLE FOR MOVING BULK MATERIAL

CROSS REFERENCE TO RELATED APPLICATIONS

My commonly assigned, concurrently filed patent application Ser. No. 501,836 entitled "Self Training Belt Conveyor With Digging Elements" which is now U.S. Pat. No. 4,506,781.

BACKGROUND OF THE INVENTION

1. Field of the Invention

This invention relates to apparatus for moving bulk materials short distances and more particularly to a tethered vehicle which skids on the bulk material and in so doing, moves the material toward the tethered end of the vehicle. By bulk material is meant all types of flowable solid materials such as for example, crushed ores, rocks, coal, salt, sand and other granular materials and products such as grain and other particulate materials.

2. Prior Art

In recovering bulk materials from bins, hoppers, silos, the holds of barges and ships and other cargo and storage chambers, it is often difficult to maneuver the unloading device into the corners and close to the walls to recover all of the material. This is particularly true in the case of ships where the hatch usually does not expose the entire hold and the clam shell unloader or bucket ladder, or other continuous unloader which lifts the material out of the hold cannot reach under the deck.

Presently, it is common practice in unloading bulk material from ships, after the unloader has removed all the material it can reach, to lower a bulldozer into the hold to bring the material under the deck within range of the unloader. This method of recovering hard to reach material is tedious and inefficient, and, in the event of large amounts of residual material, constitutes a danger to the bulldozer operator from cave-ins.

It has been proposed that scraper conveyors can be lowered into the hold of a ship for moving bulk material toward a vertical transporter such as disclosed in U.S. Pat. No. 4,170,433. However, the apparatus requires two transversely mounted scraper conveyors and an operator to manipulate a digger arm movable along one of the scraper conveyors. Thus, this arrangement is cumbersome, difficult to set up and move from hold to hold and still requires an operator in the hold.

It has also been proposed to use a tethered vehicle to move bulk material. For instance, U.S. Pat. No. 3,153,476 suggests a self-propelled device in which a bladed cylinder is tethered by a winch and rotated by an internally mounted motor to move stone and ore. The device is moved laterally by differential operation of winches at either end of the cylinder or by making the cylinder in two halves and rotating the two halves at different speeds. U.S. Pat. No. 3,029,926 discloses another cylindrical device which is tethered by a winch. It recovers corn from the edges of a silo and is moved laterally by an operator who applies manual force to handles on the sides of the device. Both of these prior art tethered vehicles are difficult to maneuver and the latter device is obviously not suitable for large scale operations.

SUMMARY OF THE INVENTION

The present invention encompasses a tethered vehicle for moving bulk material in which the hitch to which the tethering rope is connected is selectively adjustable laterally with respect to the longitudinal axis of the vehicle. When the traction means, which in the preferred form is a pair of endless tracks, pulls against the tethering rope, the vehicle skids, thereby transferring bulk material toward the rear, or tethered, end. With the hitch aligned with the longitudinal axis, the vehicle will remain in place and transfer bulk material underneath it. With the hitch point shifted to one side of the vehicle longitudinal axis, the vehicle skids sideways under the influence of the traction force and the tethering rope force because the two are no longer pulling in line, thereby creating a lateral component of force. This lateral force causes the vehicle to move sideways, with the rate of lateral movement increasing as the offset of the hitch point from the vehicle longitudinal axis increases. Lateral displacement of the hitch point to the opposite side of the longitudinal axis causes the vehicle to skid sideways in the other direction. Through controlled lateral displacement of the hitch point the vehicle can sweep a large area. In one form, the hitch includes a threaded rod mounted transversely to the vehicle longitudinal axis and a traveling nut to which the tethering rope is connected and which translates across the one end of the vehicle as the threaded rod is rotated.

In accordance with another aspect of the invention, a tethered vehicle with an elongated frame can be suspended by a rope connected to the hitch at the one end at a point which is above the plane containing the vehicle center of gravity. In this manner, the vehicle will hang with its longitudinal axis forming an acute angle with the horizontal so that as the vehicle is lowered to a substantially horizontal surface, it will land upright. This is especially useful in lowering the vehicle through a narrow opening in the top of a storage chamber such as the hold of a ship. The vehicle can be suspended by its tethering rope or a separate hoist rope can be used. By using a separate hoist rope, the means for translating the tethering rope hitch point need not be made as robust.

Where the traction means is a pair of endless track members, they may be driven, differentially if required, to position the vehicle over the spot where digging is to begin. The tethering rope is then cinched and the vehicle begins transferring material. By adjusting the lateral position of the tethering rope hitch point, the vehicle can transfer material from a large area. With the drive means for the endless tracks and the translating portion of the hitch, controlled remotely, no operator need enter the hold and be subjected to cave-ins. When operating on top of a deep layer of bulk material, there is a tendency for the vehicle to dig straight down so that the lateral component of the driving force produced by shifting the hitch point laterally may become insufficient to overcome the resistance of the material forming the side wall of the resultant depression. In order to cause the vehicle to skid to one side under these conditions, the opposite track is run faster than the one in the direction of the skid so that it digs deeper causing the plane of the vehicle to tilt relative to the horizontal to reduce the lateral resistance.

In the preferred form of the invention, the endless track members encircle the elongated frame so that they also form the vehicle upper surface. The hitch extends laterally from the sides of the frame near one end and then up and over the upper runs of the endless track members. In this arrangement, should the vehicle become bured in a slide, the endless track members can be reversed and the vehicle will back out of the pile carrying with it bulk material which has fallen on the upper runs.

In accordance with another aspect of the invention, a tethered vehicle for moving bulk material includes at least one endless track member formed of an endless belt and at least one endless wire rope which extends around the inside of the loop of the endless belt. The wire rope is connected to the endless belt throughout its length by a resilient rail member which is secured to the inner surface of the endless belt and which encircles the wire rope. The side edges of the resilient rail member are tapered inward from the inner belt surface and end pulleys which define the runs of the belt are provided with correspondingly shaped grooves which are slightly smaller in width than the resilient rail member so that the latter is squeezed firmly to couple the wire rope to the belt as they pass around the end pulleys together. The resilient rail member is preferably made of two longitudinal halves with notches in confronting faces which receive the wire rope and each longitudinal half is preferably made of a series of discrete blocks with meshing fingers between adjacent blocks. By coupling the wire rope to the endless belt, tension induced in the rope resists the lateral forces imposed on the belt as the vehicle skids sideways and assures that the endless track member trains properly on the pulleys. Two or more wire ropes and resilient rail members may be laterally spaced across the belt. The blocks are preferably secured to the belt by elongated fasteners which pass through the block and belt and may also secure digging means such as cleats to the outer surface of the belt.

In a preferred form of the invention, the vehicle frame comprises a structurally rigid, sealed, elongated box in which the endless track drive motor is mounted for protection against dust and grit. The end pulleys are mounted between the protruding ends of channel members which extend along the sides of the elongated box and beyond each end. The endless track is mounted for rotation around the end pulleys with the elongated box inside the belt loop. The hitch includes means connected to the channel members and extending around the edges of the endless track with the motor for laterally positioning the hitch point being located again, inside the sealed box. In a vehicle with two endless tracks, two of the described units are placed side-by-side and joined together along the adjacent longitudinal channel members.

In an alternate form of the invention, the trailing ends of the lower runs of the endless tracks trail upward to permit the vehicle to pile material higher behind it. In this configuration, the structurally rigid elongated sealed boxes which form the core of the vehicle frame and for that matter, the overall profile of the vehicle, assume a triangular configuration.

The tethered vehicle of this invention is a rugged, light weight, highly maneuverable device which can be suspended from a rope and lowered into a storage chamber where it can be remotely controlled to quickly and efficiently transfer bulk material. While it is especially useful within confined storage areas where it can dig out material from hard to reach areas, it can also be employed in open areas both for moving bulk material toward a reclaimer or spreading bulk material away from a stacker.

DESCRIPTION OF THE PREFERRED EMBODIMENT

The vehicle of the present invention comprises at least one, and preferably two, traction means in the form of endless tracks 1 and 3, each trained around end pulleys 5 and 7 mounted side-by-side on an elongated frame designated generally by the reference character 9.

The frame 9 comprises two halves each supporting one of the endless tracks 1 and 3 joined side-by-side and each including a structurally rigid, sealed elongated box 11 having top and bottom walls 13 and 15 respectively, side walls 17, and end walls 19 all made of plate steel. Elongated channel members 21 extend along the sides of the elongated boxes and are connected thereto by cross members in the form of channel members 23 which extend transversely through the elongated box 11 at spaced locations. The end pulleys 5 and 7 are mounted to opposite ends of the frame 9 by slots 25 in the elongated members 21. The two halves of the frame 9 are joined together by plates 27 welded to the top and bottom flanges of adjacent channel members 21.

Figure 1:
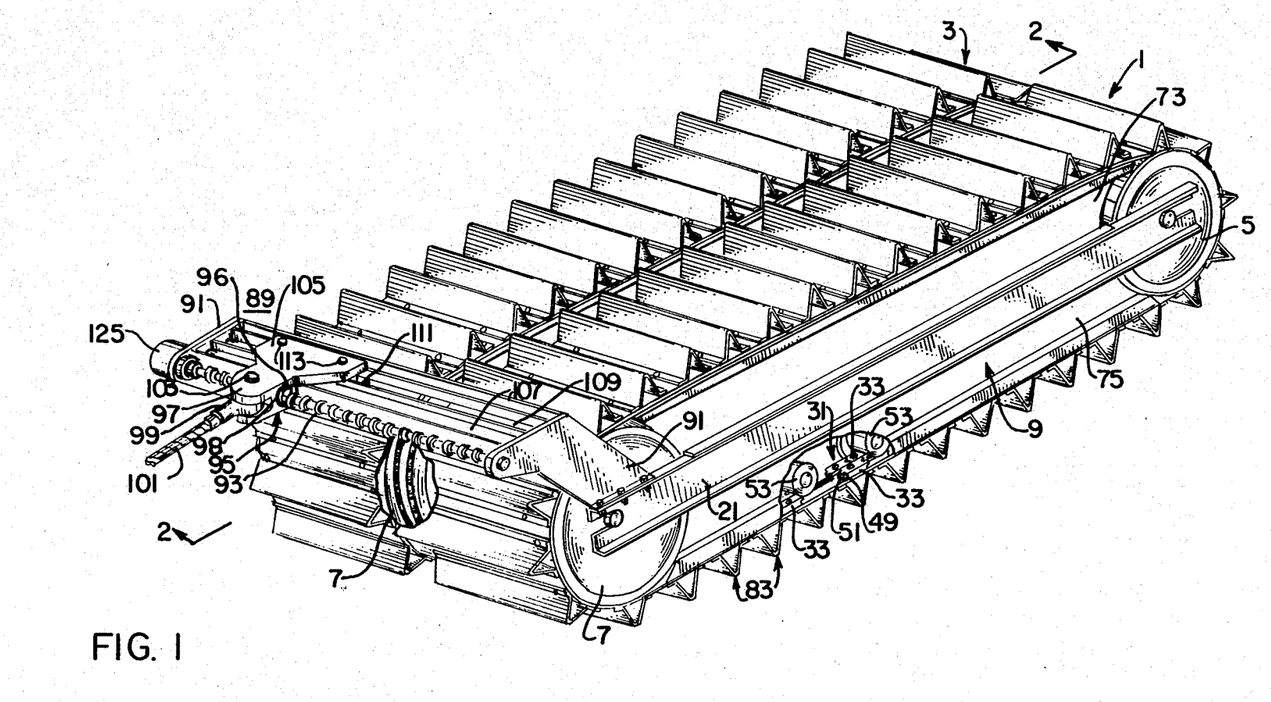
FIG. 1 is an isometric view of a tethered vehicle in accordance with the teachings of the invention.
Figure 2:
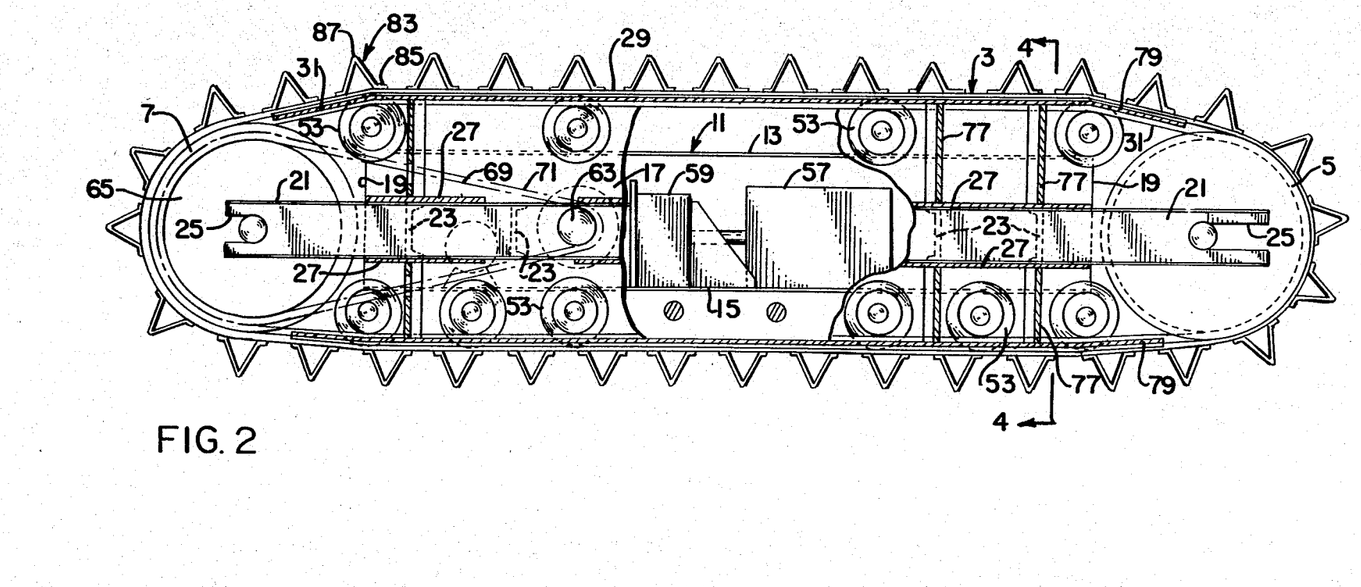
FIG. 2 is a longitudinal, vertical section through the vehicle of FIG. 1 taken along the line 2—2 with some parts broken away.
Figure 4:
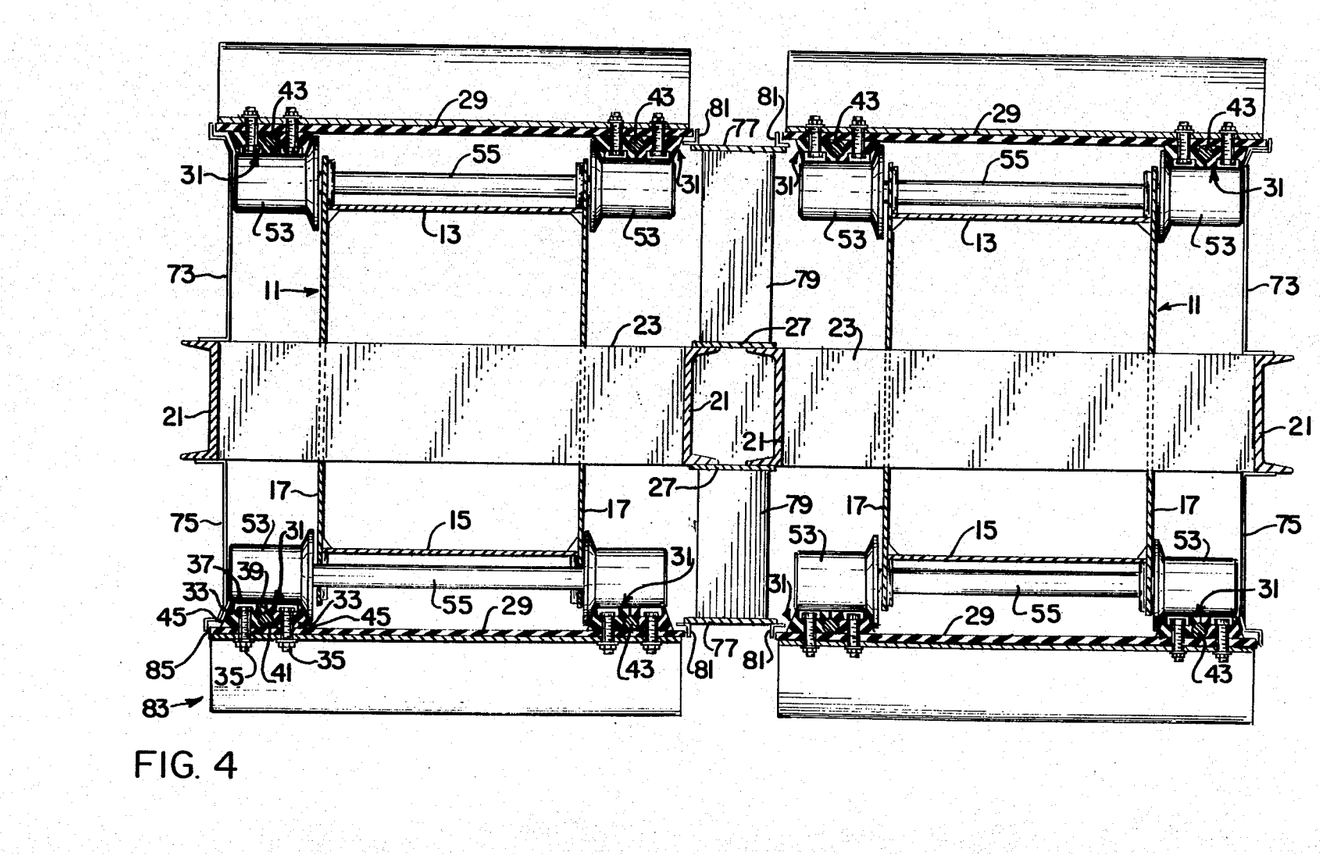
FIG. 4 is a vertical cross-section through the vehicle of FIGS. 1 through 3 taken along the line 4—4 in FIG. 2.

The endless tracks 1 and 3 each comprise an endless belt 29 with resilient rail members 31 secured to the inner surface of the belt adjacent each edge. As best seen in FIGS. 1 and 4, the resilient rail members each comprise two rows of discrete blocks 33 of resilient material bolted side-by-side to the belt 29 by bolts 35 seated in countersunk bores 37 in each block. Confronting side faces 39 of discrete blocks 33 in the two rows forming a resilient rail member 31 are provided with longitudinal slots 41 in which wire ropes 43 are loosely received. The other side surfaces 45 of the discrete blocks 33 are tapered inward from the inner surface of the belt to give the cross-section of the composite rail member 31 a trapezoidal configuration.

Figure 3:
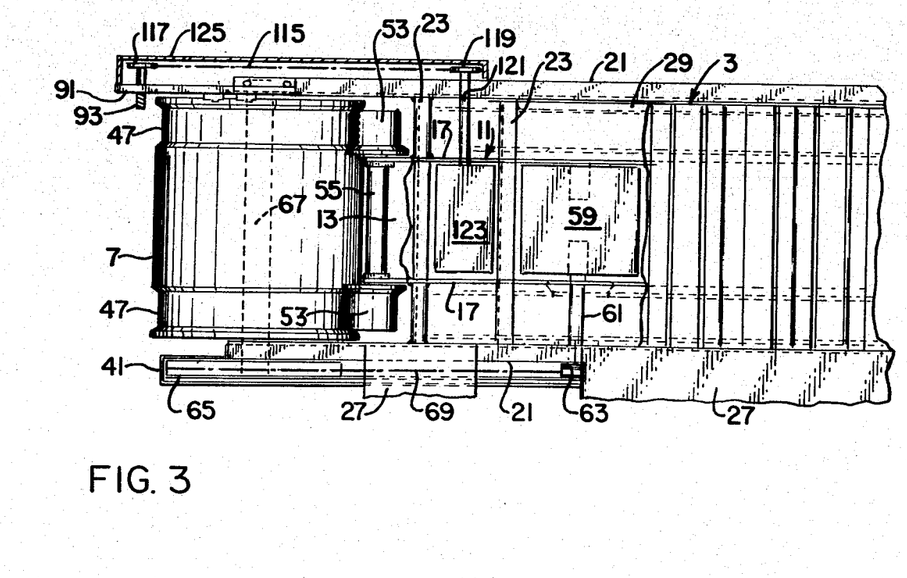
FIG. 3 is a top plan view of a portion of the vehicle as shown in FIG. 2 with some parts broken away.

As seen in FIG. 3, the end pulleys, such as 7 shown, are provided with circumferential grooves 47 which correspond in cross-section to the rail members 31. However, as explained in detail in the above-referenced related application, the width of the grooves 47 is slightly less than the width of the resilient rail members 31. As a result, the resilient rail members 31 are wedged down into the grooves 47 to firmly couple the wire ropes to the endless belt 29 as they pass around the end pulleys 5 and 7 together. With the endless belt coupled to the wire ropes at the end pulleys, the tension induced in the belt resists the digging forces, to be discussed below, tending to pull the belt radially away from the end pulley, and the lateral forces, also to be discussed in detail, which tend to cause the endless belt 29 to creep axially along the pulleys 5 and 7. As also explained fully in the related application, the ends of the discrete blocks in each row are provided with projections 49 and recesses 51 which mesh to provide a flexible, continuous rail member 31.

Between the end pulleys 5 and 7, the endless belt is supported at spaced locations, which are closer together on the bottom run, by flanged idler pulleys 53 on which the rail members 31 ride. The two rows of discrete blocks making up the resilient rail members are not wedged by these idler pulleys hence, the wire ropes 43 remain only loosely coupled to the endless belt between the end pulleys so that the ropes and endless belt may accommodate separately for variations in load and in modulus of elasticity. The idler pulleys 53 are mounted in pairs on the ends of shafts 55 which pass through and are supported by vertical extensions on the side walls 17 of the sealed, elongated box 11.

Each of the endless tracks 1 and 3 is driven by its own electric motor 57 through a gear reducer 59 both of which are mounted inside the sealed elongated box 11 to protect them from the dust and/or grit that is likely to be present in the environment in which the vehicle is used. This drive unit powers the associated endless tracks 1 or 3 through a chain drive which includes a shaft 61 extending laterally through the side wall 17 of the sealed box 11 and the channel member 21, a sprocket 63 mounted on the end of shaft 61, a second sprocket 65 connected to the shaft 67 of end pulley 7 and a chain 69 which engages both sprockets. The chain and sprockets are enclosed in a shield 71 to protect them from dust, grit and other debris.

In order to keep the bulk material, and as much as possible dust and grit, out of the moving parts of the endless tracks, upper and lower shields, 73 and 75 respectively, extend vertically from the outside channel members 21 and around the edges of the endless belts 29 between the end pulleys. In the gap between the two tracks, shield plates 77 supported at spaced locations by channel members 79, and angles 81 mounted on these shield plates, prevent bulk material and debris from getting under the tracks.

The outer surfaces of the endless belts 29 of the endless tracks 1 and 3 are provided with digging means, preferably in the form of discrete, rigid cleats 83 extending across the belt transverse to the direction of belt movement. The cleats 83 are triangular in cross-section with flanges 85 along each edge and are secured to the belts 29 by the bolts 35 which pass through holes in the flanges and also secure the resilient blocks 33 to the inside surface of the belt. The pointed ends 87 of the cleats may be provided with hardfacing to prolong their life.

The vehicle is tethered through a hitch 89 which includes swept back supports 91 bolted to the outer channel members 21 at the end adjacent the driven pulleys 7 and extending upward outside the endless tracks 1 and 3. A threaded rod 93 extends transversely across the vehicle above and behind the pulleys 7 and is journaled for rotation in the supports 91. A traveling nut 95 threadedly engages the threaded rod 93 and is provided with a clevis 97 in which the coupling 99 of a tethering rope 101 is pivotally secured by pin 103. An extension 105 on the traveling nut 95 slides over a pair of parallel channels 107 extending between the supports 91 which are spaced to form a groove 109 between them. A locking bar 111 slidably engages the undersides of the channels 107 and is secured to the extension 105 on the traveling nut by bolts 113 which extend through the groove 109. Blades 96 on each side of the traveling nut 95 cut bulk material out of the threads in the threaded rod 93 and resilient wipers 98 remove any remaining dust from the threads before they enter the traveling nut.

A chain 115 (see FIG. 3) which engages a sprocket 117 mounted on the end of threaded rod 93 is driven by a sprocket 119 on an extension 121 on the shaft of an electric motor 123 mounted inside the sealed box 11 inside the endless track 3. The chain 115 and sprockets 117 and 119 are protected from bulk material, dust and grit by a shield 125. Operation of the motor 123 rotates the threaded rod 93 which, in turn, causes the traveling nut 95 to translate laterally across the rear of the vehicle. The extension 105 on the traveling nut, and depending upon the direction of rotation of the threaded rod 93, the locking plate 111, resist the torque applied to the traveling nut by the rotating threaded rod so that the nut can be advanced or retracted along the rod.

Figure 5:
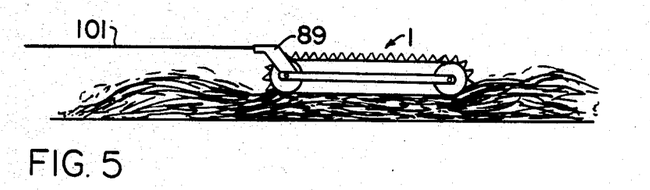
FIG. 5 is a side elevation view of a vehicle according to the invention in operation moving bulk material.

In operation, the vehicle can be advanced to the desired location and driven up onto the bulk material to be moved by operation of the motors 57 with steering provided by varying the speed of the two motors relative to one another. The motors are operated remotely through an embilical cord (not shown) which provides electrical power. In this manner, the operator does not have to be exposed to the dangers of a cave-in of the bulk material. Once in position, the tethering rope 101 is cinched and the endless tracks are driven so as to pull against the restraint of the tethering rope. Since the vehicle cannot move, it skids in position with the cleats 83 on the endless tracks pulling bulk material rearward and throwing it behind the vehicle as shown schematically in FIG. 5. If desired, the tethering rope 101 can be winched in slowly to move the bulk material farther rearward. On the other hand, as the vehicle becomes starved for material, the tethering rope can be paid out to permit the vehicle to advance farther into the pile. It is therefore, desirable that the tethering rope be attached to a rope drum which would pay out or pull in the rope on demand.

As the cleats on the endless belt dig into the bulk material, a radial component generated by the digging force tends to cause the endless belts to pull away from the lead pulleys 5. However, tension in the endless belts wedges the resilient rail members down into the grooves in the end pulleys to firmly couple the wire ropes to the belts as they pass around the end pulleys together. As a result, the radial component of the digging force induces a tension in the wire ropes which resists separation of the belts from the pulleys. While the application of tension to the wire ropes tends to relieve the wedging action produced by tension in the endless belts, the resiliency of the resilient rail members and the other parameters are such that sufficient gripping force remains to maintain the coupling of the wire ropes to the endless belt as they pass around the pulleys.

It is also possible to bias the wire ropes with a tension force which will wedge the resilient rail members down into the pulley grooves.

Figure 6:
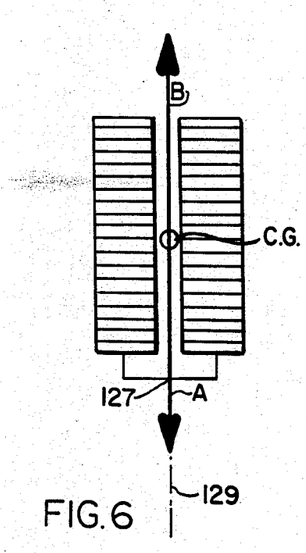
FIGS. 6 through 11 are schematic diagrams illustrating the forces acting on the vehicle of the invention under various operating conditions.
Figure 7:
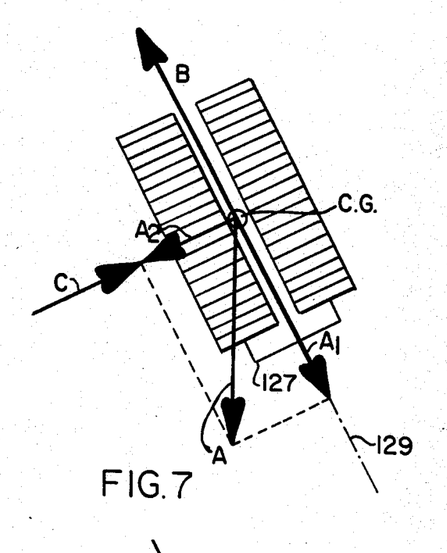
Figure 8:
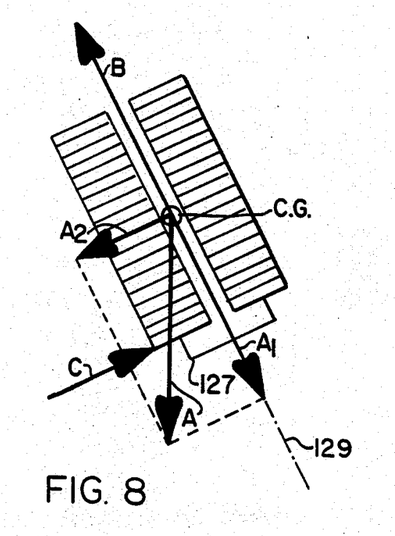
Figure 9:
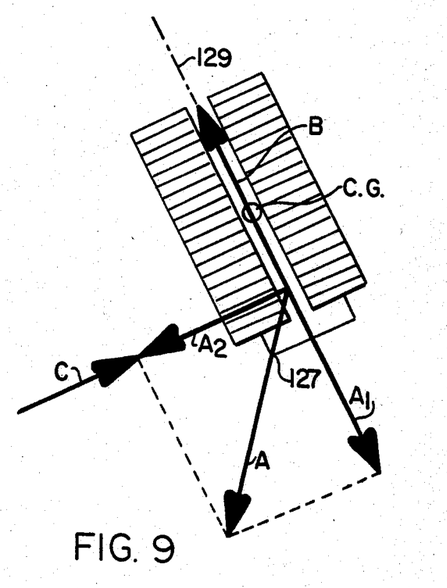
Figure 10:
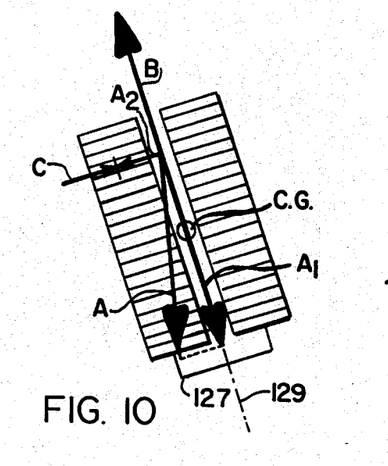
Figure 11:
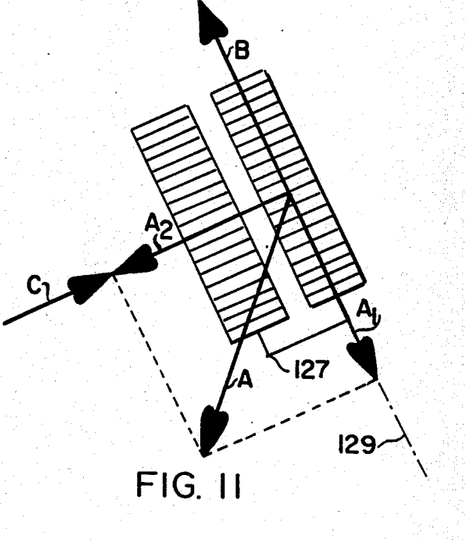

It is a unique feature of the present invention that lateral movement of the tethered vehicle can be effected by translation of the hitch point laterally with respect to the longitudinal axis of the vehicle. This phenomenon can be explained by reference to the schematic sketches of FIGS. 6 through 11. As illustrated in FIG. 6, when the hitch point 127 is aligned with the longitudinal axis 129 of the vehicle, the restraining force exerted by the tethering rope just balances the pulling force B generated by the endless tracks and the vehicle remains stationary with the tracks skidding. When, however, the hitch point 127 is moved to one side of the vehicle, as demonstrated in FIG. 7, the restraining force A is resolved into two components: $A_1$ which balances the pulling force B, and $A_2$ which is a lateral force tending to cause the vehicle to skid sideways. This lateral driving force is resisted by a force C acting through the center of pressure of the bulk material. As a result, the vehicle will accelerate in a sideward direction until the force C just balances the lateral driving force $A_2$. Should the center of pressure of the bulk material move toward the rear of the vehicle, the offset between the lateral driving force $A_2$ and the resistance forces generated by the bulk material C form a couple, which for the arrangement shown in FIG. 8, causes the vehicle to twist counterclockwise. Under these conditions, the vehicle will twist sufficiently to bring the intersection of the pulling force B and restraining force A in line with the force C as illustrated in FIG. 9. If, on the other hand, the center of pressure of the bulk material moves forward, the vehicle will straighten out some to reestablish equilibrium as shown in FIG. 10. Should the pulling force shift to one side the vehicle will twist, as shown in FIG. 11, until the forces are again in equilibrium. Obviously, the vehicle can be made to skid to the right by translating the hitch point to the right of the vehicle longitudinal axis. It is also evident from the sketches of FIGS. 6 through 11, that the greater the lateral displacement of the hitch point, the faster the vehicle will skid sideways and thus, in the situation shown in FIG. 11, the vehicle will skid rapidly to the left. The lateral component of the driving force also has an adverse effect. The reaction to this force tends to cause the endless belts to creep along the end pulleys. However, with the present invention, a lateral shift of a belt tends to cause the trapezoidal shaped resilient rail member to ride up on the tapered wall of the end pulley which applies tension to the wire rope which in turn, resists belt creep. Again, a biasing tension could be applied to the wire ropes.

Thus, through the very simple expedient of laterally translating the hitch point, the tethered vehicle can be caused to sweep back and forth. By combining this motion with paying out or reeling in of the tethering rope, the entire area of a storage chamber can be reached. By tethering the vehicle to a movable restraint, such as the bucket ladder in a ship unloader, even greater flexibility is acheived.

Figure 12:
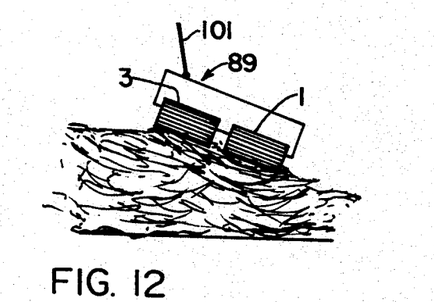
FIG. 12 is an end elevation view illustrating operation of the invention on a deep bed of material.

As mentioned previously, the vehicle has a tendency to sink straight down into the pile when operating on top of a deep layer of bulk material. By deep is meant that the bulk material under the vehicle is several times the depth of the cleats. Under these conditions, it is possible that the lateral driving force generated by shifting the hitch point laterally will be insufficient to overcome the resistance of the material along the sides of this depression thereby preventing the vehicle from skidding sideward. However, by operating the endless track on the side to which the hitch has been shifted at a lower speed than the other track, the plane of the vehicle tilts horizontally, as illustrated in FIG. 12. This raises the side edge of the track in the direction of the skid to lower the resistance of the bulk material to the lateral driving force, as illustrated in FIG. 12. As a result, the vehicle can sweep back and forth even when operating on a deep layer of material by running the track on the outside of the skid at a higher speed than that on the inside.

Figure 13:
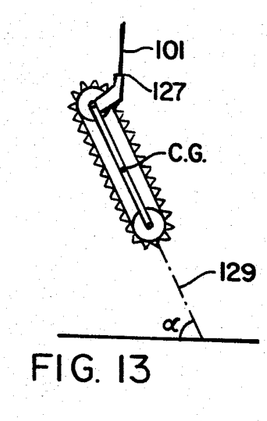
FIG. 13 is a side elevation view of a vehicle according to the invention being lowered by its tethering rope.

Another significant feature of the present invention is that the hitch point, i.e. the traveling nut 95, is located above the center of gravity C.G. of the vehicle when the vehicle is resting on a horizontal surface. With this arrangement, the vehicle can be raised by the tethering rope 101 and it will hang downward with the vehicle longitudinal axis 129 making an acute angle with the horizontal as shown in FIG. 13. The suspended vehicle presents a small projection into the horizontal so that it may be easily inserted into and withdrawn from a storage chamber with a narrow opening, but when it is lowered to the horizontal it will always land upright. This is particularly useful in unloading bulk material from the cargo hold of a ship having a small hatch opening. While in the preferred embodiment of the invention, the tethering rope is also used to hoist the vehicle, it is possible to have a separate hoist rope.

Since the vehicle is operated remotely, the danger to the crew from cave-ins of bulk material is eliminated. In fact, if bulk material should cave-in onto the vehicle, the motors 57 can merely be reversed and the vehicle will back out of the pile, laying down in front of it, bulk material which has fallen onto the top of the endless tracks. Since the vehicle is so easily inserted and removed by the tethering rope, the vehicle can be introduced into the hold whenever the need arises. Thus, if the bulk material has a propensity for standing at an angle of repose at or near 90° creating a potential for a severe and devasting sluff down upon the digging head during normal discharge, the vehicle may be introduced into the hold before the bottom of the hold is reached and employed to induce a mild sluff down. After this sluff down has been induced, the vehicle may be lifted clear and normal discharge resumed without danger to the digging head.

Figure 14:
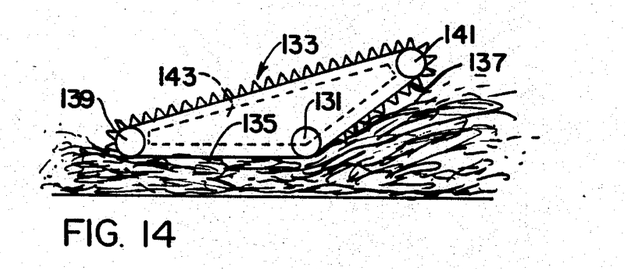
FIG. 14 is a side elevation view of a modified form of the invention.

A modified form of the invention is illustrated in FIG. 14 whereof a guide pulley 131 guides the lower run of the endless track 133 from a horizontal leading portion 135 to an upwardly and rearwardly directed trailing portion 137 as it passes from the head pulley 139 to the drive pulley 141. In this embodiment, the structurally rigid, sealed, elongated boxes 143 which form the core of the frame for each endless track, have a wide angled V-shaped bottom wall which gives the profile of the vehicle a triangular configuration. With this arrangement, the vehicle can pile up transferred material much higher behind it as shown in FIG. 14.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A vehicle restrained by a tethering rope for moving bulk materials, said vehicle comprising:
   a frame having a longitudinal axis;
   traction means mounted to the frame to extend therebelow and to rotate in a plane parallel to said longitudinal axis of the frame;
   motive means on said frame for rotating said traction means; and
   hitch means, including a hitch member to which the tethering rope is secured, connected to one end of the frame to restrain the vehicle as the motive means rotates the traction means to pull against the tethering rope so that bulk material under the traction means is moved toward the first end of said frame, said hitch means including means to selectively move said hitch member laterally on the frame such that the point at which the tethering rope is connected relative to the frame can be adjusted laterally with respect to the longitudinal axis of the frame, to control lateral movement of the vehicle, said traction means and tethering rope providing the sole points of support for said vehicle.

2. The vehicle of claim 1 wherein said frame is elongated and the traction means is endless track means extending along the elongated frame.

3. The vehicle of claim 2 wherein said elongated frame includes a lead end pulley and a trailing end pulley mounted to opposite ends of said frame for supporting said endless track means for rotation, and guide roll means mounted to the lower portion thereof between said end pulleys to divide the lower run of said endless track means between said end pulleys into a leading portion which extends horizontally rearward from the lead end pulley to the guide pulley means and a trailing portion which extends upwardly and rearwardly from the guide pulley means to the trailing end pulley.

4. The vehicle of claim 2 wherein said elongated frame comprises:
   a sealed, structurally rigid, elongated box;
   elongated members extending along each side of the box and beyond each end thereof;
   an end pulley mounted for rotation between the extended ends of said elongated members at each end of said elongated box;
   wherein said endless track means is mounted for rotation about the end pulleys with said sealed, structurally rigid, elongated box inside the loop formed by the endless track means;
   wherein said motive means is mounted inside said sealed box and includes means extending through a wall of said box and connected to an end pulley for driving said endless track means; and
   wherein said hitch means includes means connected to said elongated members and extending around the edges and over the top of said endless track means and drive means mounted inside said sealed box.

5. The vehicle of claim 4 comprising two said frames mounted side by side each with its own endless track means and motive means therefore mounted inside the associated sealed, elongated box.

6. The vehicle of claim 5 wherein said motive means includes means to rotate the two endless track means at the same speed and at different speeds such that with the hitch means operated to adjust the hitch point to one side of said longitudinal frame axis and said motive means operated to rotate the endless track means on said one side slower than the other, the plane of the vehicle tilts laterally upward toward said one side to reduce the resistance to lateral movement of the vehicle as the endless track means on the other side digs deeper into a deep layer of bulk material.

7. The vehicle of claim 1 wherein said hitch means includes an elongated screw mounted transverse to said longitudinal axis of said frame, and said hitch member comprises a traveling nut mounted on said elongated screw to which the tethering rope is connected and said means for moving said hitch member laterally includes means for rotating said elongated screw to cause the traveling nut, and thereby the point at which the tethering rope is connected to the vehicle, to move laterally with respect to the longitudinal axis of the frame.

8. The vehicle of claim 7 wherein said hitch means is connected to said frame at said one end at a point which is above the center of gravity of the vehicle when the vehicle is on a horizontal surface such that the vehicle may be suspended by said tethering rope but when lowered to a substantially horizontal surface it will assume a position with the traction means contacting the substantially horizontal surface.

9. The vehicle of claim 8 wherein said frame is elongated and said traction means is a pair of endless tracks mounted side-by-side and extending along the elongated frame.

10. The vehicle of claim 9 wherein said motive means includes means for selectively rotating said endless tracks at the same speed and at different speeds.

11. The vehicle of claim 7 including means attached to said traveling nut and extending into the threads of said elongated screw to clean said threads prior to their passing through said traveling nut.

12. A vehicle restrained by a tethering rope for moving bulk material, said vehicle comprising:
   an elongated frame having a longitudinal axis;
   endless track means;
   pulley means rotatably mounted on the frame near each end thereof for rotation about axes transverse to the longitudinal axis of the frame to support said endless track means for rotation in a plane parallel to said longitudinal axis of the frame with one run of the endless track means between the pulley means extending below the frame;
   hitch means mounted on one end of said frame to which said tethering rope is connected; and
   motive means mounted on said frame for rotating said endless track means including pulling against the restraint of said tethering rope to thereby move bulk material under the one run of the endless track means toward said one end of the frame;
   said endless track means comprising:
     an endless belt forming a loop and having bulk material gripping means on the outer surface thereof;
     an endless wire rope inside the loop of the endless belt; and
     a resilient rail member secured to the inner surface of the endless belt and encircling said wire rope said resilient rail member having its side edges tapered inward toward each other from the inner belt surface, inward, said pulley means having grooves in the surface thereof correspondingly shaped to receive said rail member as the endless belt, endless wire rope and rail member all pass around the pulley means together and said pulley grooves being slightly narrower than said resilient rail member such that the resilient rail member is wedged down into said groove to firmly couple the wire rope to the belt as they pass around the pulley means.

13. The vehicle of claim 12 wherein said resilient rail member is formed of two longitudinal halves with said wire rope received in longitudinal grooves in the confronting faces of the two longitudinal halves.

14. The vehicle of claim 13 wherein each of said longitudinal halves of said resilient rail member comprises a series of discrete blocks.

15. The vehicle of claim 14 wherein each of said discrete blocks is secured to the endless belt by at least one elongated fastener that extends through the block and said belt.

16. The vehicle of claim 15 wherein the bulk material gripping means on the outer surface of said belt comprise cleats extending transversely across the endless belt at longitudinally spaced locations and wherein said cleats are secured to said endless belt at least in part by said elongated fasteners which secure said discrete blocks to said belt.

17. The vehicle of claim 16 wherein said endless track means includes a plurality of endless wire ropes inside the loop of the endless belt and two series of resilient block members, secured to the endless belt with elongated fasteners which also secure the cleats to the belt, encircling each of said endless wire ropes to form a resilient rail member and wherein said pulley members include grooves shaped to receive each of said resilient rail members and to wedge them against the wire ropes to firmly couple the wire ropes to the endless belt as they pass around the pulley means together.

18. The vehicle of claim 17 wherein said endless track means includes a pair of endless belts, each supported by separate end pulleys and each having a plurality of wire ropes secured thereto by two series of resilient blocks which encircle the associated wire rope and form a resilient rail member and wherein the motive means includes means for selectively rotating said endless belts at the same or different speeds.

19. The vehicle of claim 18 wherein adjacent discrete blocks in each series thereof are provided with meshing fingers.

20. The vehicle of claim 12 wherein the second run of said endless belt between said pulley means forms the upper surface of the vehicle and wherein said motive means is operative to rotate the endless track means in one direction to pull against the tethering rope and thereby move bulk material under said first run toward the one end of the vehicle and to rotate the endless track means in the opposite direction to drive said vehicle toward said one end and to carry with it and deposit in front of the vehicle any bulk material which may have fallen onto said second run.

21. The vehicle of claim 20 wherein said frame includes hitch support means near said one end which support said hitch above the second run of said endless track means.

22. The vehicle of claim 21 wherein said hitch support means includes end members extending laterally from each side of said frame near said one end and then upwardly outside said endless track means, and wherein said hitch means includes a threaded rod rotatably supported between said end members, a traveling nut, to which the tethering rope is secured, threadly engaging the threaded rod and drive means for rotating the threaded rod to selectively adjust the location of the point at which the tethering rope is connected to the vehicle laterally with respect to the longitudinal axis of the vehicle.

23. The vehicle of claim 12 wherein said endless track means includes at least two laterally spaced endless wire ropes inside the loop of the endless belt and a resilient rail member secured to the inner surface of the endless belt and encircling each of said wire ropes and wherein said pulley means have grooves shaped to receive each of said resilient rail members and to wedge the same against the wire ropes to firmly couple the wire ropes to the endless belt as they pass around the pulley means together.

24. The vehicle of claim 12 wherein said endless track means includes two parallel endless belts separately supported by end pulleys and each with an endless wire rope and a resilient rail member coupling the wire rope to the associated belt and wherein the motive means includes means for selectively rotating said two endless belts at the same and different speeds.

25. Apparatus for moving bulk material comprising:
a vehicle; and
flexible tension member means for tethering and hoisting said vehicle;
said vehicle comprising:
an elongated frame having a top and a bottom;
endless track means mounted on the elongated frame for rotation in a plane parallel to the longitudinal axis of the frame about pulleys adjacent each end of the elongated frame and extending below the bottom of the frame to contact bulk material under the vehicle;
hitch means for connecting said flexible tension member means to one end of said vehicle with the connection for hoisting said vehicle being above the plane containing the center of gravity of the vehicle such that when the vehicle is hoisted by the flexible tension member means, it hangs suspended with the bottom of the frame forming an acute angle with the horizontal and when the vehicle is lowered to a substantially horizontal surface, the endless track means extending below the bottom of the frame supports the vehicle on said surface; and
motive means for rotating the endless track means to pull the vehicle against the tethering restraint of the flexible tension member means to move bulk material under the endless track means toward said one end of the vehicle.

26. The apparatus of claim 25 wherein said flexible tension member means comprises a tethering rope and a hoist rope and wherein said hitch means includes means above the plane containing the center of gravity of the vehicle to which the hoist rope is connected and means to which the tethering rope is connected which is selectively adjustable laterally with respect to the longitudinal axis of the vehicle.

27. The apparatus of claim 25 wherein said endless track means comprises a pair of endless track members and wherein said motive means includes means for selectively rotating said endless track members at the same speed and at different speeds.

28. The apparatus of claim 27 wherein the upper runs of said endless track members run along the top of said frame to form the upper surface of said vehicle, said hitch means includes means extending laterally outward from said one end of the frame and then around the outside of the loops formed by said endless track members and wherein said motive means includes means to rotate said endless track members in a first direction to pull against the tethering restraint of said flexible tension member means to move bulk material under the bottom run of said endless track members toward said one end of the vehicle and to rotate the endless track members in the opposite direction to move the vehicle in the direction of said one end thereof and to carry with it and deposit in front of it, any bulk material which has been deposited on the upper runs of said endless track members.

29. The apparatus of claim 28 wherein the flexible tension member means includes a tethering rope and a hoist rope and wherein said hitch means includes means above the plane containing the center of gravity of the vehicle which is parallel to the longitudinal and lateral axes thereof to which the hoist rope is connected and means for connecting the tethering rope to the vehicle which is adjustable laterally with respect to the longitudinal axis of the vehicle.

* * * * *